April 20, 1948.  W. J. PHANEUF  2,439,822
SAW TOOTH SURFACE BROACH
Filed Nov. 2, 1943  2 Sheets-Sheet 2
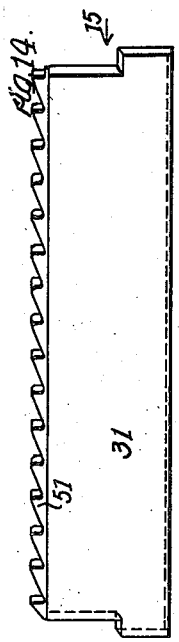
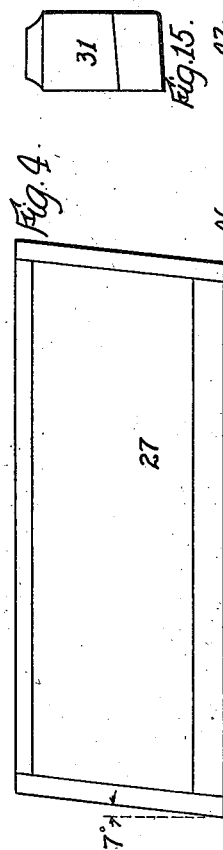
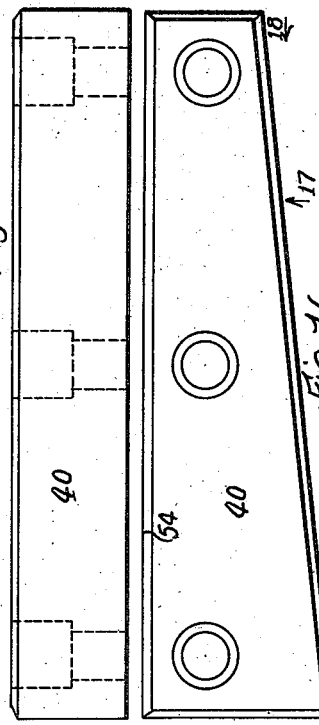
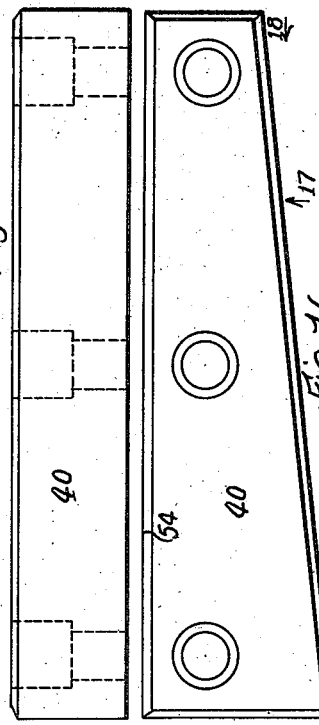
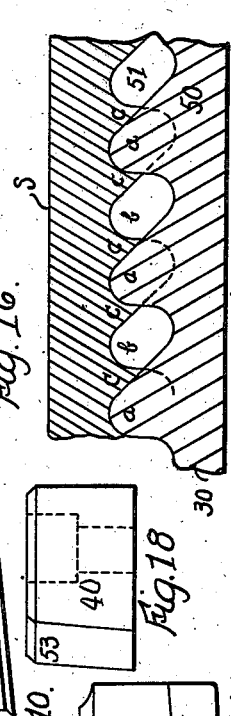
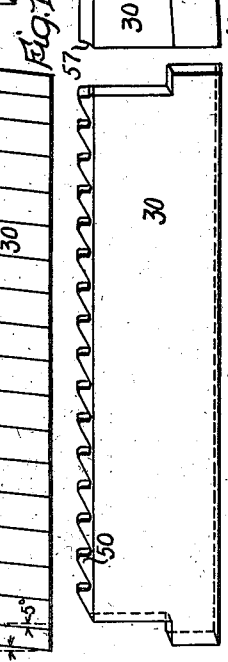
Inventor.
Witrose J. Phaneuf.
By Attorney
Chas. T. Hawley Patented Apr. 20, 1948

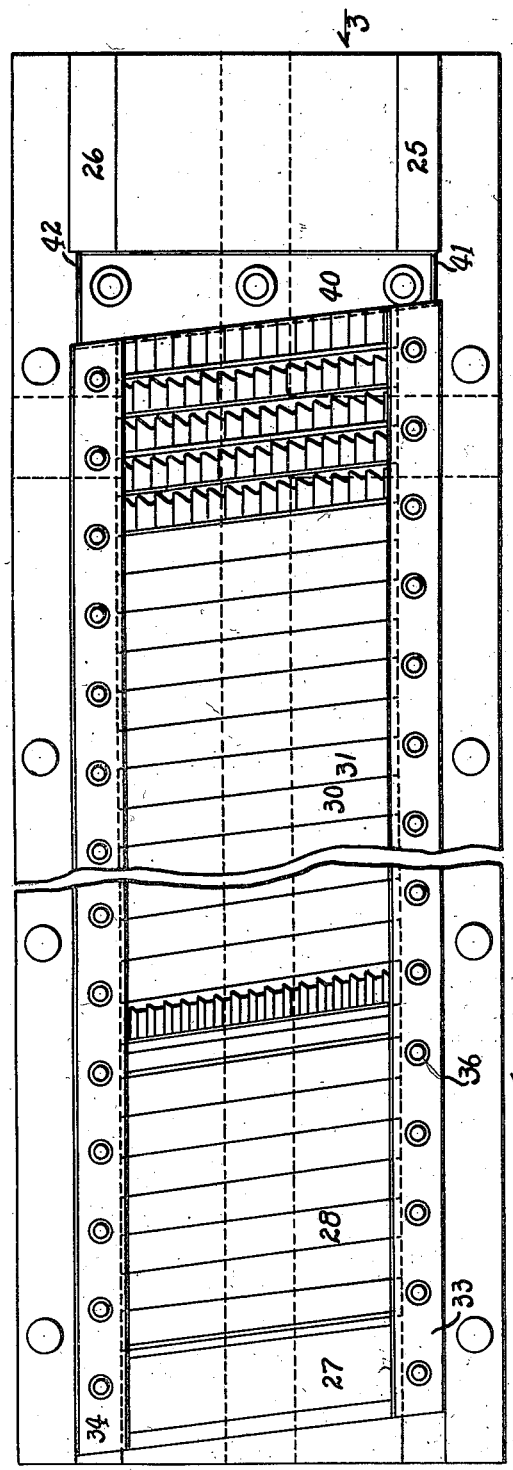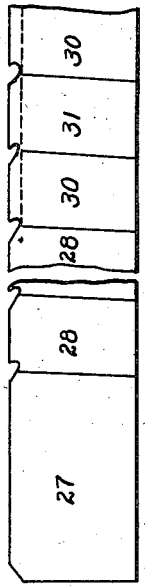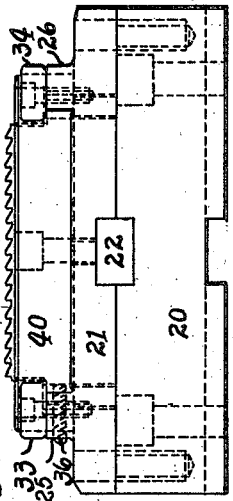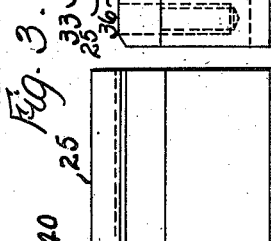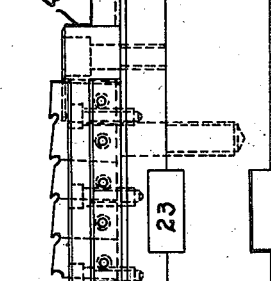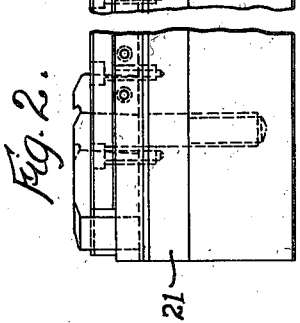

2,439,822

UNITED STATES PATENT OFFICE 2,439,822

SAW-TOOTH SURFACE BROACH

Wilrose J. Phaneuf, Hudson, Mass., assignor to The Lapointe Machine Tool Company, Hudson, Mass., a corporation of Maine Application November 2, 1943, Serial No. 508,758

2 Claims. (Cl. 90—33)

This invention relates to a surface type broach which is particularly adapted to the formation of band saw teeth or to the manufacture of other similar products having very sharp pointed projections.

It is the general object of my invention to provide a broach for such purposes in which the broaching teeth may be of much more substantial construction than the sharp saw teeth which they produce. In such broaching teeth, I entirely avoid sharp points or narrow pointed depressions.

In the carrying out of this invention, I provide a broach having a plurality of successive broaching units, and with the cutting teeth in each unit at double the linear pitch of the teeth to be produced. The broaching units are so disposed in the broach that the cutting teeth in successive units are aligned in alternate series, whereby saw teeth of the desired pitch may be formed by the coaction of the cutting teeth in successive cutting units.

A preferred form of the invention is shown in the drawings, in which

Fig. 1 is a plan view of my improved broach;
Fig. 2 is a partial side elevation thereof;
Fig. 3 is an end view of the broach;
Fig. 4 is a plan view of a pilot block;
Figs. 5 and 6 are side and end views thereof;
Fig. 7 is a plan view of a shearing unit;
Figs. 8 and 9 are side and end views thereof;
Fig. 10 is a plan view of a toothed cutting unit;
Figs. 11 and 12 are side and end views thereof;
Fig. 13 is a plan view of a toothed cutting unit of the alternate series;
Figs. 14 and 15 are side and end views thereof;
Fig. 16 is a plan view of a backing black;
Figs. 17 and 18 are side and end views thereof;
Fig. 19 is a diagrammatic view illustrating the operation of successive cutting teeth in the formation of the saw teeth; and
Fig. 20 illustrates the assembly of the pilot block and cutting units.

Referring to Figs. 1, 2 and 3, my improved broach comprises a base member 20 adapted to be secured to the plunger or ram of a surface type broaching machine, preferably but not necessarily of the vertical type. A plate 21 is secured to the base member 20 and is firmly held from displacement by a longitudinal key 22 and a cross key 23. The plate 21 has upstanding flanges 25 and 26, spaced apart to receive a pilot block 27, a plurality of shearing units 28, and a plurality of alternately disposed toothed cutting units 30 and 31.

The pilot block and the shearing and cutting units are held in position between the flanges 25 and 26 by clamping bars 33 and 34 which project inward over end lugs on the block 27 and on the units 28, 30 and 31. Clamping screws 36 are provided in the flange 25 and engage the ends of the blocks and units to firmly seat them against the flange 26. A backing block 40 is firmly secured to the plate 21 in recesses 41 and 42 in the flanges 25 and 26 and resists the end pressures of the shearing and cutting units during the broaching operation.

I will now describe the detailed construction of the pilot block 27, the shearing units 28, the cutting units 30 and 31, and the backing block 40.

The pilot block is shown in detail in Figs. 4, 5 and 6 and comprises a solid steel block having lugs or flanges 45 at its ends for clamping purposes and having its upper front and back edges beveled as indicated at 46 and 47. It will be noted that the ends of the block 27 are formed at a slight angle, shown in the drawings as being 7°. This angle is for the purpose of disposing the cutting edges of the shearing and cutting units at a similar angle to the line of broach travel, thus producing a slight shearing cut.

It will also be noted that the right-hand edge of the block 27, as viewed in Fig. 6, is cut back at an angle of 3°. This incline coacts with the shearing and cutting units to provide necessary clearance or relief, as will be explained. The height of the pilot block is made slightly less than the height of the first shearing unit 28.

One of the shearing units 28 is shown in Figs. 7, 8 and 9. It is provided with end lugs or projections 47 for clamping purposes, with a cutting edge 48, and is cut away at 7° on the ends to match the pilot block and to produce a shearing cut. The unit 28 is also cut away at 3° on the bottom, so that it may coact with the inclined side surface of the pilot block 27 and provide clearance or relief for the top surface 49 which engages the work at the cutting edge. A plurality of these shearing units, such as 6 or 8, is provided and the units progressively increase in height by very small increments, such as 0.001" per unit.

The function of the shearing units is to accurately size the stock before the cutting operation begins. In the ordinary use of the broach, a large number of strips of stock are superposed and clamped in position and are sheared and cut at a single stroke.

One of the cutting units 30 is shown in Figs. 10, 11 and 12 and comprises a member which is in general quite similar to one of the shearing units 28 and which is similarly provided with end flanges and with cut-away or inclined end and bottom faces. The top face of the cutting unit is provided with a plurality of teeth 50, spaced apart at double the linear pitch of the saw teeth to be produced. These teeth are of substantial section and both the points and the roots of the teeth are rounded, as clearly shown in Fig. 19.

The teeth 50 are cut at an angle of 5°, as indicated in Fig. 10, so that the end angle of 7° provides a slight clearance or relief for the teeth on their cutting faces.

One of the cutting units 31 is shown in Figs. 13, 14 and 15. This unit 31 is identical with the unit 30 previously described, except that the teeth 51 are staggered one-half space lengthwise with respect to the teeth 50 in the unit 30.

The backing block 40 is shown in detail in Figs. 16, 17 and 18 and is provided with a face 53 formed at a 7° angle in plan and at a 3° angle in elevation.

In assembling my improved broach from the units shown and described, the pilot block 27 is placed at the left or entering end of the broach as shown in Figs. 1 and 20. A succession of shearing units 28 of progressively increased height are then assembled against the block 27, and these shearing units are followed by a succession of cutting units 30 and 31, alternately disposed.

The cutting units 30 provide teeth of gradually increasing height in one set of lineal series and the units 31 provide cutting teeth of gradually increasing height in an alternately disposed set of linear series.

The progressive increase in tooth height may be on the order of one and one-half thousandths of an inch per unit, and each series of units 30 and 31 may comprise 25 or more separate cutting units. The last two or three units in each series are preferably of uniform height, for a final sizing effect.

The manner in which the cutting teeth 50 and 51 produce the desired sharp-pointed saw teeth is made clear in Fig. 19, which shows portions of cutting units 30 and 31 coacting with a strip of saw stock S. The teeth 50 of the units 30 remove the stock in the sectioned areas $a$ in successive increments, and the teeth 51 in the units 31 similarly and alternately remove the stock in the unsectioned areas $b$. The stock portions $c$ which are left between these removed areas $a$ and $b$ form the teeth of the saw. It will be noted that one side of each tooth is formed by a tooth 50, while the other side of the tooth is formed by a tooth 51. Thus neither tooth is required to have a sharp point or a sharp root.

The teeth 50 and 51 may thus be of such size and contour that they will resist wear and will remain in effective operation for long periods. The shearing and cutting units may be sharpened when necessary by grinding on their cutting edges, indicated at 48 in Fig. 9 and at 57 in Fig. 12.

By the use of my improved broach, together with suitable clamping and feeding devices, band saw teeth may be cut in a surface broaching machine with great accuracy and with extreme rapidity and greatly improved and increased production may be achieved.

Having thus described my invention and the advantages thereof, I do not wish to be limited to the details herein disclosed, otherwise than as set forth in the claims, but what I claim is:

1. In a surface broach comprising a plate having side flanges and a continuous recessed flat cutter-supporting surface, a plurality of substantially rectangular elongated toothed cutting units each having its top face substantially at 90° to the parallel front and back faces of said unit and having its bottom face angularly disposed to form an included angle with the front face of said unit of slightly less than 90°, and means to align and position said units between said side flanges in said broach and with the bottom faces of said units seated against said continuous recessed surface of said broach and with said units thereby rearwardly inclined in accordance with said slight angle, whereby each cutting unit is relieved on its top surface.

2. A surface broach for broaching sharply pointed saw teeth comprising a flanged plate and a plurality of separate toothed cutting units secured therein, all of the cutting teeth in said units having substantially rounded tops and roots and said teeth being spaced apart in said units double the saw tooth pitch, the teeth in one-half of said units being staggered one saw tooth space with respect to the teeth in the remaining cutting units, said units being alternated successively in said flanged plate to dispose the teeth in alternate parallel linear series, and the cutting edges of the teeth in successively adjacent units having their lines of broaching action intersecting at the saw tooth points and relatively remote from their rounded tops and roots.

WILROSE J. PHANEUF.

REFERENCES CITED

The following references are of record in the file of this patent:

UNITED STATES PATENTS

| Number | Name | Date |
| --- | --- | --- |
| 2,173,074 | Romaine | Sept. 12, 1939 |
| 2,204,537 | Lapointe et al. | June 11, 1940 |
| 28,508 | Schutte | May 29, 1860 |
| 330,499 | Laybolte | Nov. 17, 1885 |
| 1,932,223 | Lindquist | Oct. 24, 1933 |
| 1,776,711 | Unger | Sept. 23, 1930 |
| 1,979,973 | Halborg | Nov. 6, 1934 |
| 180,409 | Alvord | Aug. 1, 1876 |
| 1,275,006 | Eden, Jr. | Aug. 6, 1918 |
| 1,440,933 | Perkins et al. | Jan. 2, 1923 |
| 1,589,901 | Roberts | June 22, 1926 |
| 1,935,774 | Halborg | Nov. 21, 1933 |
| 2,250,392 | Phaneuf | July 22, 1941 |